(No Model.)
C. LIGHTBODY.
Waste or Sewer Trap.
No. 241,146. Patented May 10, 1881.
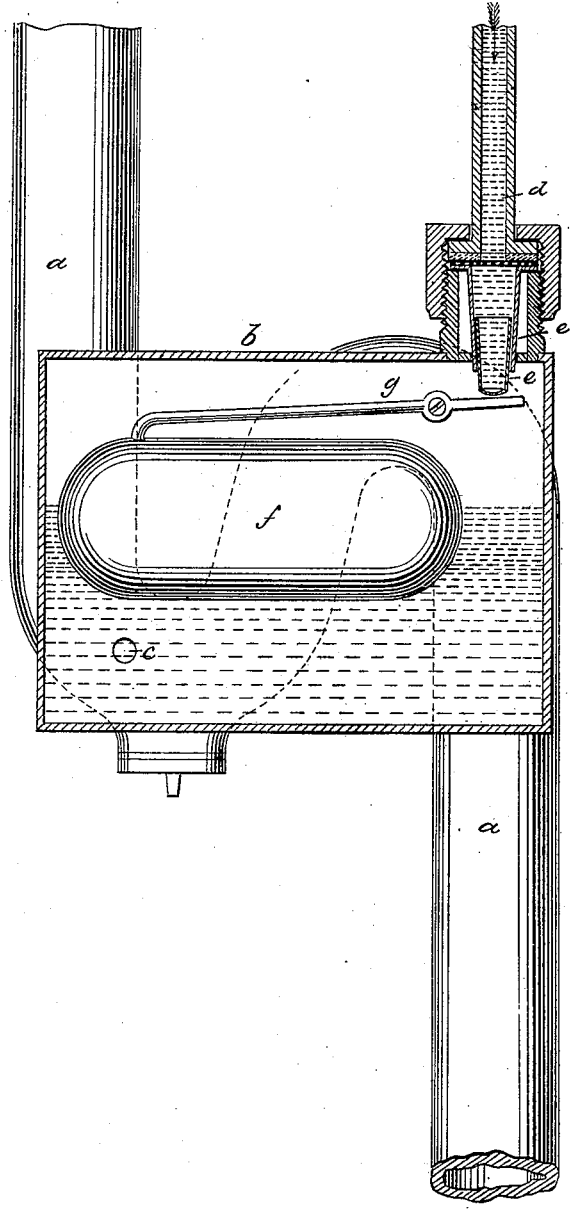
WITNESSES:
Chas. M. Higgins
John E. Gavin
INVENTOR:
Colin Lightbody
by S. H. Wales
Atty.

UNITED STATES PATENT OFFICE.

COLIN LIGHTBODY, OF BROOKLYN, NEW YORK.

WASTE OR SEWER TRAP.

SPECIFICATION forming part of Letters Patent No. 241,146, dated May 10, 1881.

Application filed April 6, 1880. (No model.)

*To all whom it may concern:*

Be it known that I, COLIN LIGHTBODY, of Brooklyn, Kings county, New York, have invented certain new and useful Improvements in Waste or Sewer Traps, of which the following is a specification.

It is well known that the water-seal in the ordinary waste or sewer trap is liable to become removed or exhausted by occasional siphoning out during ordinary usage or by slow evaporation during disuse, thus leaving the passage of the trap open to admit the entrance of deleterious gases into the apartments of the building, which is known to be a source of disease. To prevent this in the case of water-closets, a water-tank has been connected with the bend of the trap, with a water-supply pipe discharging into the tank and controlled by a float-valve therein, so as to constantly renew or maintain the water-seal in the trap, and thus obviate the effects of siphoning or evaporation and prevent the inflow of sewer-gas.

My invention is an improvement on this device, which has heretofore been adapted to water-closet traps, and not to waste or sewer traps in general, for the tank has been made uninclosed, or with an open top, which, while not impracticable in case of a water-closet, would, in the case of a sewer-trap connected with the waste-pipes of a building, allow, as will be obvious, a disastrous overflow through said open tank in cases where the pipe should become unusually flushed, especially during heavy rains.

The main feature of my invention consists, therefore, in entirely inclosing the tank, having internal communication only with the trap, so that all external overflow is effectually prevented, and the trap thus adapted with great advantage as a sewer or waste trap generally.

My invention also consists in the special construction of the tank and the special form of valve used, whereby other advantages are secured, as hereinafter fully set forth.

The figure of the drawing annexed is a side elevation of an ordinary trap provided with my improvement, the tank of which is shown in central vertical section.

As illustrated, $a$ indicates the trap, and $b$ a small water box or reservoir, mounted on the side of the trap and communicating near the bottom with the lower bend of the trap by an opening or short passage, $c$. The water-box is connected with the water-pipes of the building or other suitable water-supply by the coupling or inlet $d$, which preferably opens into the top of the water-box, as shown, and is provided with a valve, $e$, which is normally closed by the pressure of the water. The water-box, however, contains a float, $f$, fixed on a pivoted lever, $g$, the short arm of which presses upon and opens the valve when the water and float descend below a normal level, and, on the contrary, when the water in the box or trap rises to its proper level, the float also rises and permits the valve to close. Now, the water in the box and trap will, of course, stand at the same level, and the float-valve is so arranged that when this level is sufficiently high to form a proper seal in the trap the float will be raised and the valve closed. Should, however, the water-seal in the trap fall below a proper level by siphoning, evaporation, or other cause, it will fall correspondingly in the water-box, and, thus causing the float to descend, will cause the valve to open and admit a quantity of fresh water through the inlet $d$, which will instantly restore the seal to its proper height, after which the valve will again close on the rising of the float to its normal position. Hence by this simple addition to the ordinary trap the water-seal can never become exhausted, as the seal will be constantly and instantly renewed whenever required, thus maintaining the trap in a proper sanitary condition and effectually preventing the passage of deleterious sewer-gases into the apartments.

The water-box may be formed separately from the trap, of sheet metal or other material, and then attached to the trap, or it may be cast on the trap as a continuous and permanent part thereof.

It will be observed that according to my invention the water tank or box is inclosed on all sides, but communicates interiorly with the interior of the trap, and hence, no matter how flush the sewer or waste pipes and trap may be, the waste water may enter and fill the tank, but cannot overflow or escape therefrom into the apartment, cellar, or other place where the trap may be located. Furthermore, the inclosed tank prevents the possibility of any effluvia escaping from the water of the trap into the apartment, as must occur with an open tank. This feature is thus an important advantage of my invention, which adapts the trap for application to sewer or waste pipes generally, for wash-basins, sinks, &c., as well as for water-closets, and fulfills all requirements of safety and efficiency in each case.

Any suitable form of float-valve may be used; but I have shown a simple and effective form, which consists of two telescopic sections or thimbles, $e\ e'$, of thin elastic metal, the outer one, $e'$, of which projects into the discharge-orifice of the water-inlet $d$, and has an open end, through which the inner thimble, $e$, protrudes, which latter has a closed end, which contacts with the float-lever. The water-pressure thus forces the inner thimble, $e$, to its seat, and, expanding the same, forms a tight joint in a simple and effective manner, while a slight pressure of the float-lever on the smaller thimble will raise the same from its seat and cause both thimbles to relax and admit the water freely, thus forming a sensitive yet effective valve well suited for operation by a small float, such as my device employs.

When the coupling is unscrewed the valve may be removed, if required, by seizing the outer thimble, which is sufficiently large and extends up sufficiently high to admit of this, as seen in the drawing.

The thimble-valves are formed of sheet metal, preferably brass, stamped into shape by dies, which is both a cheap and simple mode of manufacture, and obviates grinding.

What I claim as my invention is—

1. A waste or sewer trap provided with a water box or tank communicating with the interior or bend of the trap, and provided with a water-supply pipe and float-valve to maintain the trap-seal constant, or nearly so, as described, the said tank being inclosed exteriorly on all sides, whereby overflow or leakage therefrom is prevented in case of overflushing of the trap or waste-pipes, substantially as herein set forth.

2. The combination, with the waste or sewer trap having a water-inlet to restore the water-seal, as set forth, of the elastic thimble-valve $e$, controlling the discharge-orifice of said inlet, and a float operating said valve by the rise or fall of the water in the trap, substantially as herein set forth.

3. The combination, with a waste or sewer trap having a water-inlet to restore the water-seal, as set forth, of the two telescopic thimbles or valve-sections $e\ e'$, controlling the discharge-orifice of the inlet, and a float acting to open or close said valve by the rise or fall of the water in the trap, substantially as herein specified.

COLIN LIGHTBODY.

Witnesses:
HENRY B. RIGGS,
EDWARD H. WALES.